United States Patent Office 3,462,370
Patented Aug. 19, 1969

3,462,370
DRY SOLID ORGANIC PEROXIDE COMPOUNDS
Heinz Winter, Pullach, near Munich, and Gottfried Brossmann, Hollriegelskreuth, near Munich, Germany, assignors to Elektrochemische Werke, Munchen, A.G., Hollriegelskreuth, near Munich, Germany, a corporation of Germany
No Drawing. Filed Aug. 10, 1966, Ser. No. 571,404
Claims priority, application Germany, Aug. 17, 1965,
E 29,912
Int. Cl. C11d 7/54, 7/38, 7/18
U.S. Cl. 252—186    12 Claims

ABSTRACT OF THE DISCLOSURE

Substantially dry organic peroxides are produced by forming an aqueous suspension of a selected peroxide and a plasticiser maintaining the suspension for a period of time from 5 to 10 minutes and recovering the intended substantially dry peroxide.

---

This invention relates to peroxidic compounds and particularly to processes for producing dry organic peroxides.

The invention provides a process for drying moist solid organic peroxides comprising the steps of forming a suspension containing an organic peroxide, more than 100% by weight thereof of water and at least 10% by weight thereof a plasticiser, maintaining the suspension for a period of time and recovering the resulting substantially dry organic peroxide.

Organic peroxides are often produced in a moist state containing, for example, up to 30% or even 35%, exceptionally, by weight of water. An object of this invention is to provide a process for drying peroxides without essentially using elevated temperatures and also without subjecting the peroxides to excessive friction for example by prolonged kneading. A further object of some embodiments of the invention is to also granulate peroxides in the same process step as the drying. Yet a further object of certain embodiments of the invention is to purify peroxides, for example by removing chloride ions from them, in the same process step as both the drying and, if applicable, the granulation. The peroxides produced by our inventive process are readilly storable and are preferred, for some applications, in granular form.

Advantageously the suspension contains water in at least 200% desirably in at least 400% and preferably in at least 1,000% by weight of the peroxide. When we say that water, or plasticiser, is present in a percentage by weight of the peroxide we mean by weight of the dry peroxide. The water contents quoted therefore include water introduced with the moist peroxide. Any plasticisers normally used in conjunction with organic peroxides for instance in the manufacture of synthetic resins may be used in our invention. Examples of such plasticisers are phthalic acid esters such as, most suitably, dibutyl phthalate or also diethyl phthalate or dimethyl glycol phthalate, water insoluble phosphoric acid esters such as triphenyl phosphate and tricresyl phosphate and silicone oils having a content of light petroleum fractions. The quantity of plasticiser used is, advantageously, at least 13% not more than 60% and preferably from 25% to 45% by weight of the peroxide. To produce granular dry organic peroxides according to our invention, however, the quantity of plasticiser used must not be more than 45% by weight of the peroxide.

Where it is desired to remove, for example, adhering hydrochloric acid and acid chloride radicals from the peroxide during the process of this invention the suspension must be maintained in a weakly alkaline condition, that is, having a pH between 7.0 and 9.0. Preferably the pH is maintained at from 7.5 to 8.0. Most desirably when performing such embodiments the suspension contains water in at least 400% and preferably at least 1,000% by weight of the peroxide.

The invention, therefore, particularly provides a process for drying, granulating and purifying moist organic peroxides comprising the steps of forming a suspension having a pH of between 7.0 and 9.0 and containing the organic peroxide, more than 1,000% by weight thereof of water and from 13% to 45% by weight thereof of a plasticiser, maintaining the suspension for a period of time and recovering the resulting substantially dry granular organic peroxide.

Advantageously the suspension is maintained for at least 5 minutes and preferably from 5 to 10 minutes.

This invention is applicable to any solid, organic peroxides stable at the temperature used although where a peroxide is sufficiently stable not to require the desensitising effect of a plasticiser coating one might not wish to use a process essentially using a plasticiser treatment. Such a peroxide is lauroyl peroxide. The following peroxides may advantageously be treated according to our invention at room temperature, that is to say, mesityl oxide peroxide and benzoyl peroxide. P-chlorobenzoyl peroxide and cyclohexanone hydroperoxide are further examples of compounds which may be treated. If desired somewhat elevated temperatures may be used for example 30° C.–40° C. provided that the peroxide being treated is one which is stable at such temperatures.

In carrying out our invention any order of adding the components to the suspension may be used although it is preferred to introduce the moist peroxide into the water and while maintaining the resulting suspension in agitation to add the plasticiser. To ensure even treatment of the peroxide the suspension should be maintained in agitation for the duration of the treatment. Separation of the resulting peroxide from the remaining water, now containing dissolved impurities, from the peroxides, may be by sieving or other suitable means. Where granules are produced according to this invention they will, on separation be substantially dry although they may have residual water adhering to their plasticiser-treated surfaces. This water may now be dried off by normal means since the peroxide particles are now desensitised by the plasticiser coating. When we refer to substantially dry granular peroxide we mean to include granular peroxide having such a surface coating of residual water.

Example 1

100 kgs. of moist benzoyl peroxide (water content about 25%) are stirred with 1,000 litres of water in an agitator vessel and the pH is adjusted with alkali to 7.5–8.25 kgs. of dibutyl phthalate are then introduced into the suspension while stirring. After a short time a granular product is formed having a grain size of 1–4 mm. diameter. The granular product is then separated off through a sieve with a correspondingly fine mesh.

After a draining time of about 1 hour the granulate is dried on perforated plates. A free-flowing granular product is obtained, the composition of which is 75% benzoyl peroxide and 25% plasticiser.

Example 2

100 kgs. of moist mesityl oxide peroxide (water content about 25%) are passed with about 300 litres of water through a colloid mill (minimum grinding clearance) and are introduced into an agitator vessel with a further 700 litres of water. The pH is adjusted with alkali to about 7.5–8. Next about 30 kgs. of dimethyl glycol phthalate are stirred in. A granular product is formed having a grain size of about 1 mm. diameter. The granulate obtained is then separated off through a suction filter and dried. A free-flowing granulate is obtained, the composition of which is 70% mesityl oxide peroxide and 30% plasticiser.

What is claimed is:

1. A process for drying moist organic peroxides which comprises forming a suspension containing a solid organic peroxide, water in an amount more than 100% by weight of said peroxide and between about 10 to 60% by weight, based on the peroxide, of an organic peroxide plasticizer selected from the group consisting of di-lower alkyl phthalates, triaryl phosphates and silicone oils, maintaining the suspension at a pH of from about 7–9 for a period of time between about 5 to 10 minutes and drying said suspension to remove residual surface water and recovering the resulting substantially dry organic peroxide.

2. A process as defined in claim 1 wherein said plasticizer is present in an amount at least 13% by weight of said peroxide.

3. A process as defined in claim 1 wherein said plasticizer is present in an amount not more than 45% by weight of said peroxide.

4. A process as defined in claim 3 wherein said plasticizer is present in an amount from 25% to 45% by weight of said peroxide.

5. A process as defined in claim 1 wherein said water is present, in an amount between about 200 to 1000% by weight of said peroxide.

6. A process as defined in claim 1 wherein said plasticizer is a phthalic acid ester.

7. A process as defined in claim 6 wherein said plasticizer is selected from the group consisting of dibutyl phthalate and dimethyl glycol phthalate.

8. A process as defined in claim 1 wherein said plasticizer is a water-insoluble phosphoric acid ester.

9. A substantially dry organic peroxide produced according to the process defined in claim 1.

10. A process for drying, granulating and purifying moist organic peroxides which comprises forming a suspension having a pH of between 7.0 to 9.0, said suspension containing an organic peroxide, more than 1,000% by weight thereof of water and from about 13% to 45% by weight thereof of an organic peroxide plasticizer selected from the group consisting of di-lower alkyl phthalates, triaryl phosphates and silicone oils, maintaining the suspension for a period of time between about 5 to 10 minutes, and drying said suspension to remove residual surface water and recovering the resulting substantially dry granular organic peroxide.

11. A process as defined in claim 10 wherein said organic peroxide is selected from the group consisting of benzoyl peroxide and mesityl oxide peroxide.

12. A substantially dry, granular organic peroxide produced by the process defined in claim 10.

References Cited

UNITED STATES PATENTS

| | | | |
|---|---|---|---|
| 2,453,071 | 11/1948 | Hyatt et al. | 252—186 X |
| 2,454,254 | 11/1948 | Kuoch et al. | 252—186 X |
| 2,838,472 | 6/1958 | Lucas | 252—186 X |
| 3,324,040 | 6/1967 | Spoor | 252—186 |

OTHER REFERENCES

Condensed Chemical Dictionary, Reinhold, 1961, 6th edition, pp. 1163 and 1174.

LEON D. ROSDOL, Primary Examiner

J. GLUCK, Assistant Examiner

U.S. Cl. X.R.

252—99, 103; 260—610